Dec. 9, 1930.    H. BENIOFF    1,784,415
ELECTRICAL RECORDING SEISMOGRAPH
Filed Feb. 2, 1927
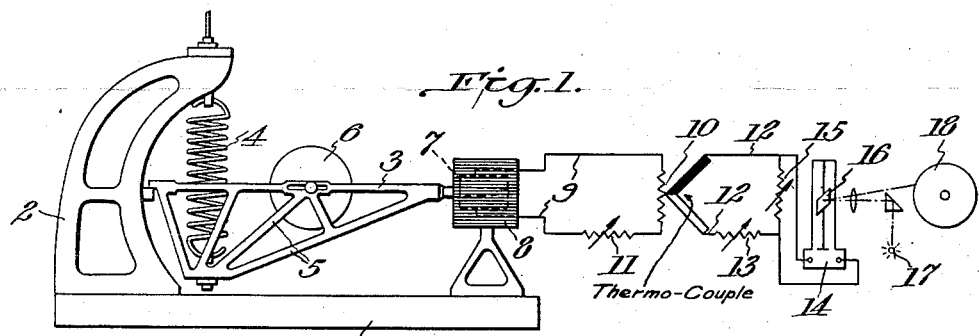
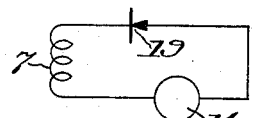
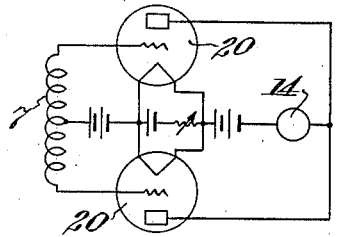
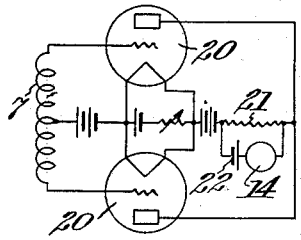
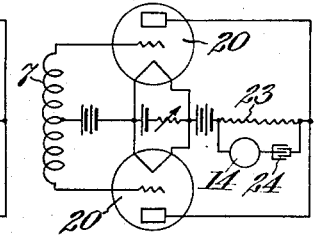
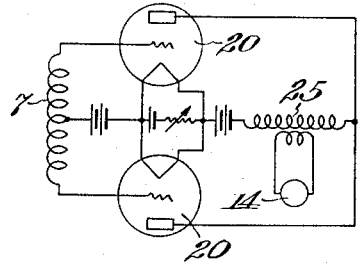
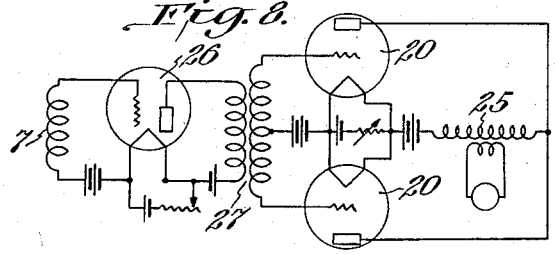
Inventor:
Hugo Benioff,
By Byrnes Townsend & Brickenstein,
Attorneys.

Patented Dec. 9, 1930

1,784,415

UNITED STATES PATENT OFFICE

HUGO BENIOFF, OF PASADENA, CALIFORNIA, ASSIGNOR TO CARNEGIE INSTITUTION OF WASHINGTON, OF WASHINGTON, DISTRICT OF COLUMBIA, A CORPORATION

ELECTRICAL RECORDING SEISMOGRAPH

Application filed February 2, 1927. Serial No. 165,418.

This invention relates to seismographs and particularly to that class of seismographs which depend upon electric currents induced by the movements of the instrument arm, one type of such instrument being known as the Galitzin seismograph. The written records of known forms of seismographs provide measurments of either the total displacement, the acceleration or the velocity of the earth particles upon which the recording instrument rests.

An object of this invention is to provide a seismograph whose response shall provide a measure of or be proportional to the kinetic energy of the earth particles.

A further object is to provide a seismograph whose response shall provide a measure of or be proportional to the kinetic energy due to both the positive and negative velocities of the earth particles.

Another object of my invention is to provide the necessary damping of the seismometer pendulum by properly proportioning the strength of the main field and the resistance of the circuit, whereby additional damping means are unnecessary.

Further objects will be apparent from the following description taken in connection with the accompanying drawings wherein Fig. 1 shows a seismograph of the Galitzin type, with my invention connected therewith.

Fig. 2 shows another form of my invention.

Figs. 3, 4, 5, 6 and 7 all show modified forms of my invention.

Fig. 8 shows another modification in which the electric current is amplified before being impressed upon the indicating system.

Referring to Fig. 1, in which I have shown a Galitzin seismograph for registering the vertical components, the base mounting 1 has a rigid upright 2 thereon upon which is pivoted the balanced or pendulum arm 3. Arm 3 is also supported from the upper part of upright 2 by means of spring 4 which connects to arm 3 by means of rigid links 5. Adjustably supported on pendulum 3 is a weight 6. At its outer end the pendulum carries a coil 7 which is thus free to move in the field of a stationary magnet 8, supported from base 1.

Thus far, the apparatus as described is a typical Galitzin seismograph, such as that described and illustrated in the British publication "Engineering" April 13, 1923, pages 474 to 477. My invention relates to the electrical system.

In Fig. 1 the wires 9 leading from the pendulum-supported coil 7 are connected to the heater coil of a thermo-couple 10, said circuit including an adjustable resistance 11. The thermo-couple is connected by wires 12 and a variable resistance 13 to a galvanometer 14. The variable resistance 13 is used to vary the sensitiveness of the galvanometer circuit. Bridged across the wires 12 is another variable resistance 15, for controlling the damping of the galvanometer. The galvanometer as shown has a movable mirror 16 to reflect a beam of light thrown thereon from a source 17, to a revolving drum 18, upon which is wound sensitized paper.

The galvanometer recording mechanism above described forms no part of this invention, since by the use of a properly designed galvanometer or meter, the response from the seismometer could be indicated visually or otherwise.

The general operation is obvious from the foregoing description. Any seismic or other earth disturbances are effective to oscillate the pendulum 3. Since the voltage established in the coil 7 is proportional to the velocity of the disturbance and the indicating device or recorder is a current-responsive device, the electrical circuit between the coil and recorder includes an electrical converter effective to pass to the recorder a current which is proportional to the square of the voltage generated in the coil. The thermo-couple 10 constitutes a simple relay or converter of this type. The record on the drum 18 of the current generated by the thermo-couple is therefore proportional to the square of the voltage established in coil 7, i. e. it is proportional to the velocity squared, or kinetic energy, of the seismic disturbance.

That the electromotive force produced in a system of the Galitzin type may be proportional to the velocity of the earth movements, the instrument is so constructed and adjusted that the period of the seismic or other disturbance will be short with respect to the free period of vibration of the pendulum. Also, the electrical response times of the thermocouple and galvanometer must be short compared to the period of the earth disturbance in order that the current used for indicating may be proportional to the kinetic energy.

Furthermore, the invention may be useful in other ways than recording earth movements. It may be used to test the riding characteristics or spring characteristics in trains and automobiles or other vehicles. A set of these seismometers properly arranged on a vehicle and connected to meters would enable one riding thereon to observe directly the kinetic energy in the vehicle produced by uneven surfaces on the road or tracks. It would thus be possible to determine the ratio of energy effective to produce locomotion and of energy wasted by jarring as the vehicle moves along an uneven path or track.

Another method of obtaining a current squared response is by means of a crystal rectifier, as shown in Fig. 2. In this figure, the coil 7 mounted on the pendulum 3 is connected to a crystal 19 which in turn is connected to the galvanometer 14. The current through the galvanometer is then approximately proportional to the square of the E. M. F. generated in coil 7. The means of recording the movements of the galvanometer is the same as in Fig. 1.

Seismic disturbances in general are not simple harmonic motions and consequently velocities on one side of the zero axis are neither similar in character nor equal in value to the velocities on the other side of the axis. Since the rectifier shown in Fig. 2 is conducting in one direction only, it follows that the device there shown will respond to velocities on one side of the zero axis only, and since these velocities are in general neither equal nor similar to those on the other side of said axis, the response of this system is not always adequate to determine the kinetic energy accurately. To overcome this difficulty, the system as shown in Fig. 3 may be used. In this system, the seismometer coil 7 is tapped at its center and two crystal rectifiers 19 are connected as shown to the galvanometer 14. By this means, both positive and negative velocities will be recorded, the resulting record being in kinetic energy of the earth particles.

It is understood that the recording of the galvanometer movement in this and other modifications is similar to Fig. 1.

Fig. 4 shows an indicating system using three-element vacuum tubes. In this case, the pendulum-carried coil 7 is tapped in the middle and connected to the grids of vacuum tubes 20, the plates thereof being connected to galvanometer 14. The usual A, B and C batteries are provided for the filament, plate and grid, the C battery being so adjusted that the tubes operate as rectifiers.

Fig. 5 is similar to Fig. 4 except that resistance 21 and battery 22 are arranged to balance out the residual steady plate current from the tubes.

Fig. 6 shows the galvanometer 14 shunted around an output impedance 23 by means of a coupling condenser 24, whereby the direct current component of the plate current does not pass through the galvanometer.

Fig. 7 shows a similar circuit to that of Fig. 4, but using a transformer 25 and a galvanometer 14, in place of the galvanometer above of Fig. 4.

Fig. 8 shows an indicating system in which the output from the seismometer is amplified before being impressed upon the indicating system. In this figure, the seismometer coil 7 is connected to a three-element vacuum tube 26, the plate current from which is connected to the primary of a transformer 27. The secondary of this transformer is tapped at its middle for impressing the amplified voltages upon the push-pull rectifier tubes 20.

Although there is shown only a system for giving the vertical component of the kinetic energy, it is evident that this invention may be applied to horizontal systems also, for determining the horizontal components. Three such systems are necessary to determine the total kinetic energy, one vertical and two horizontal.

In the electromagnetic seismographs now in use, and especially in the Galitzin instrument, it has been found necessary to employ a damping system for the vibrational arm or pendulum, such system usually comprising an auxiliary damping magnet whose field reacts with a copper plate mounted on the pendulum to produce eddy currents. This use of separate damping apparatus may be avoided by a suitable design of the essential electrical circuits of the seismometer. By correctly proportioning the strength of the main field, the seismometer coil dimensions, and the output circuit resistance, it is possible to provide the necessary damping without any auxiliary system. By inserting variable resister 11 in the coil circuit, the resistance of the output circuit may be regulated until the desired damping of the pendulum is obtained by the reactions of the coil 7 and the field. This system of damping is equally applicable to any electromagnetic seismometric system, whether it be designed for energy, velocity or other responses. The system is more efficient than an auxiliary damping system, since all available energy is thus used in the output circuit.

It will also be understood that the invention is not limited to the details of the Galitzin seismometer shown but will be of use in many types of electrically operated seismograph systems.

I claim:

1. Apparatus for recording the kinetic energy of seismic disturbances, comprising the combination with means operated by such disturbances to generate a current having a voltage proportional to the velocity of the disturbed earth particles, of means energized by said current-generating means and effective to produce a response proportional to the square of the voltage impressed thereon, and an indicator in the output circuit of said means.

2. Apparatus as set forth in claim 1, wherein said second means is constructed and arranged to respond to both the positive and the negative voltages developed by said current-generating means.

3. In an instrument for measuring seismic disturbances, the combination with a pendulum, a coil carried thereby, means for producing a stationary field in which said coil moves, and a current responsive indicator, of a relay arranged between said coil and said indicator, said relay being effective to produce a response proportional to the square of the voltage impressed thereon.

4. In an electromagnetic seismic recorder, the combination with a seismometer coil, movable in a stationary field, and an electrical indicator operated by the current induced in said coil, of a variable resistance in the circuit of said coil and indicator, said resistance being capable of adjustment to a value at which the reaction between said coil and said field produces the required damping of the pendulum.

In testimony whereof, I affix my signature.

HUGO BENIOFF.